Figure 1:
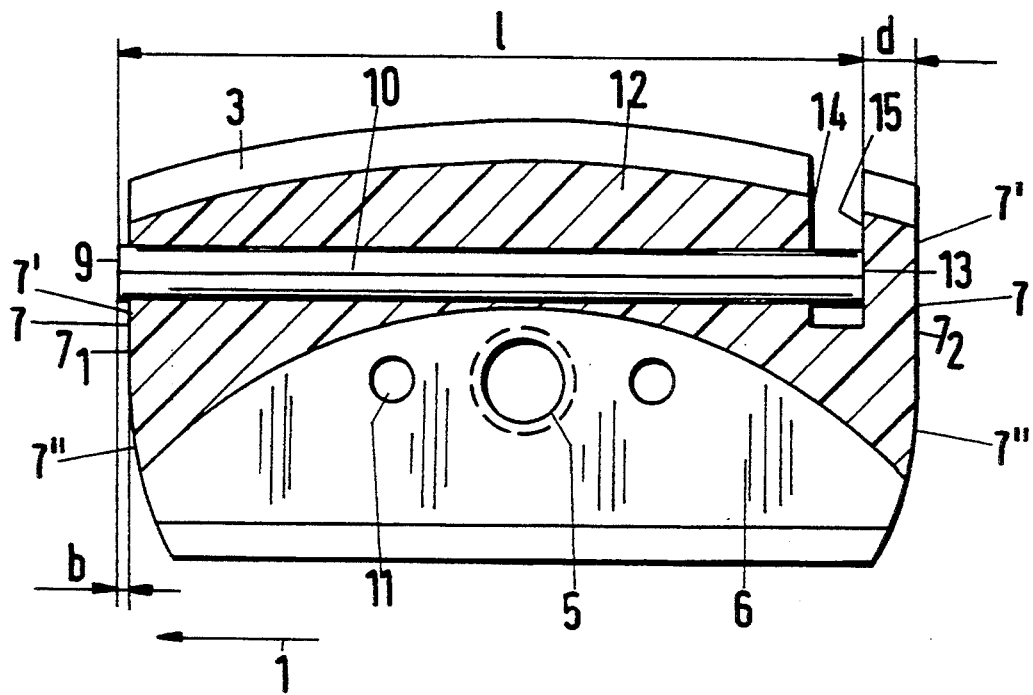

United States Patent [19]

Härtel, deceased et al.

[11] Patent Number: 5,409,103

[45] Date of Patent: Apr. 25, 1995

[54] CONVEYANCE DEVICE HAVING A LINE OF MEMBERS

[75] Inventors: Norbert Härtel, deceased, late of Rossdorf; by Ingrid Härtel, Suhl; Georg Petz, Griesheim, all of Germany

[73] Assignee: Tetra Laval Holdings & Finance S.A., Switzerland

[21] Appl. No.: 137,618

[22] Filed: Oct. 15, 1993

[30] Foreign Application Priority Data

Oct. 16, 1992 [DE] Germany ............ 42 34 907.9

[51] Int. Cl.⁶ .................................... B65G 35/08
[52] U.S. Cl. .......................................... 198/795
[58] Field of Search .......... 198/465.1, 795, 803.01, 198/850, 851

[56] References Cited

U.S. PATENT DOCUMENTS

| | | | |
|---|---|---|---|
| 2,519,179 | 8/1950 | Duncan | 198/795 X |
| 3,102,153 | 8/1963 | Stieler et al. | 198/795 X |
| 3,630,502 | 12/1971 | Schmidt | 198/465.1 |
| 5,139,131 | 8/1992 | Persson et al. | 198/346.1 |

FOREIGN PATENT DOCUMENTS

| | | |
|---|---|---|
| 0083119 | 6/1983 | European Pat. Off. |
| 1273415 | 7/1968 | Germany |
| 2756422 | 6/1979 | Germany |
| 4030362 | 4/1992 | Germany |

Primary Examiner—Cheryl L. Gastineau
Attorney, Agent, or Firm—Paul & Paul

[57] ABSTRACT

A conveyance device is disclosed having a line of members which are held by guide rails, and which include end faces located next to adjacent members. Each member has grooves disposed on opposite sides that extend in the longitudinal direction of transportation for receiving the guide rails and a drive source. Each member includes a bore that passes through the member in the transverse direction to receive an entrainment pin. Each member also includes at least one metal piece extending in the longitudinal direction of transportation that is fixed to at least one plastic part such that an end face of the plastic part projects over the metal piece in the longitudinal direction of transportation, the total length of the member being greater than the total length of the metal piece. This configuration provides reduced thermal expansion and, in addition to accurate guidance of the conveyed work pieces, provides for exact positioning under individual processing stations while also providing members that can be easily cleaned.

6 Claims, 5 Drawing Sheets

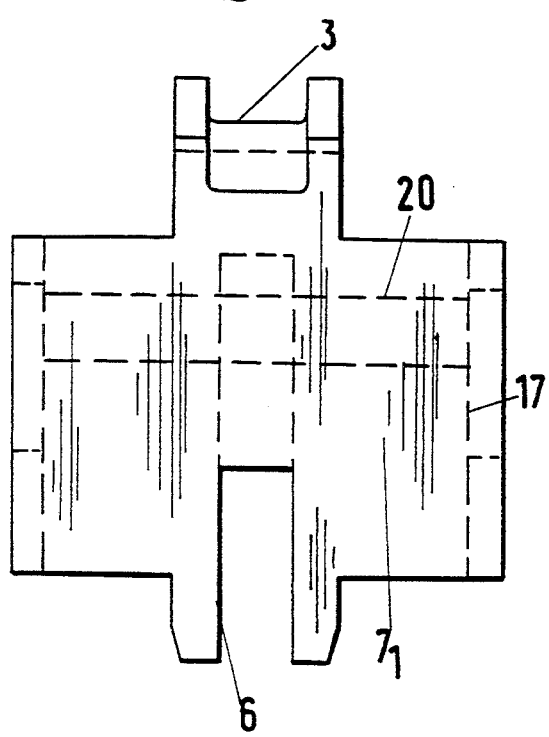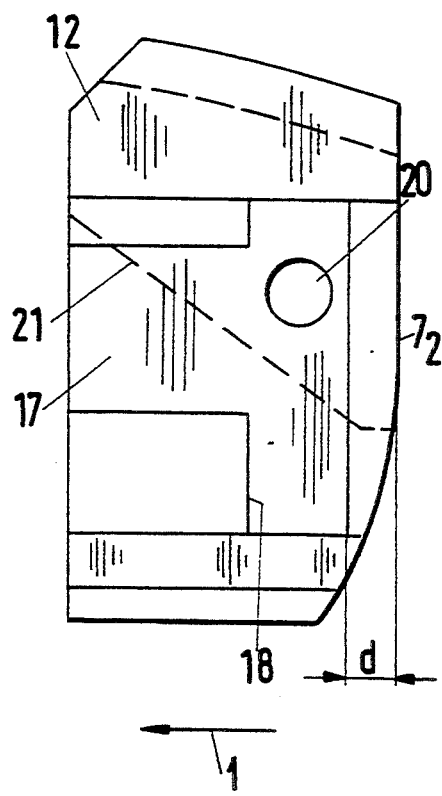

CONVEYANCE DEVICE HAVING A LINE OF MEMBERS

The invention relates to a conveyance device having a line of members which are held by means of guide rails and which are driven with their end faces in juxtaposed positions on the oppositely disposed sides of which grooves extending in the longitudinal direction of transportation are arranged for receiving guide-and drive means, wherein a bore passes through the member in the transverse extent to receive an entrainment pin.

DE 40 30 362 A1 has already disclosed a conveyance device of the above kind. The device described there in conjunction with a continuously rotating line closed in on itself has members which are disposed adjacently to one another forming a type of linked member. The members of the line are in the form of one single body made as a whole of plastics material since this provides good mechanical properties, and, in particular, good hygiene properties, for machines used in the food industry.

However, it has been shown that the heat expansion coefficient of plastics material which comes into question for these types of chain members is relatively high. Also, it is not possible to use other plastics materials with lower heat expansion coefficients. The aim of the known conveyance device is also to drive the line of members in closely juxtaposed positions relative to one another and to therefore drive it frictionally over the respective end faces of the members, e.g. by a thrust drive. However, if the line is endless, it is also possible to drive the members at a location by traction since this traction force is then converted into a pushing force. In any case, friction between the members and the guides is unavoidable. This friction is a first heat source which in some instances results in the member becoming undesirably heated. If the known conveyance device in machines for manufacturing packs for liquids is used in the hygiene region, in addition to friction which operates on the inside between the members, heat also acts from the surroundings onto the individual members, resulting in not inconsiderable heating up. In extreme instances of application, temperatures up to 60° C. have been measured with a line of members, and it was scarcely possible to remove heat in such an extreme instance of application of the conveyance device from the hygiene region of a very high output machine since the known conveyance device operated there in an enclosed space.

With the afore-mentioned instance of application twenty members were juxtaposed solely in the upper fun of the line, each of which increased in length by 1 mm due to the effects of heat and due to the heat expansion coefficient of the material, resulting in a 20 mm increase in length to the upper run. This has meant an insupportable tolerance and corresponding clamping effects and the like. Admittedly, this was an extreme instance of application with a high output machine for filling flowable contents into packs, wherein accurate movements had to be made by the conveyance device and wherein the packs had to be positioned with accuracy beneath specific stations. However, it is desirable to create a conveyance device whose properties and features are favourable in such a way that it is even possible to satisfy requirements imposed with harsh treatment and in extreme instances of application.

The aim of the invention therefore is to create a member for a conveyance device providing accurate guidance of the conveyed workpieces, exact positioning under individual processing stations and good cleaning possibilities for the members with no disadvantageous consequences resulting from the effects of heat, even with harsh treatment and under extreme conditions. Therefore, amongst other things, the aim was to create a similar member as with the known conveyance device but which has significantly less heat expansion. Therein, it was seen that the use of another material to avoid the problems of expansion to length was not possible without further ado. Owing to the hygiene requirements to be observed, sliding parts had to be provided on metal rails, and it was not possible to significantly alter the friction conditions either. A solution to the problem therefore had to be sought which employed a combination of plastics material and rust-resistant metal, since the operating conditions for liquid contents must be observed, on the one hand, and the cleaning agents must be compatible with the materials, on the other hand.

Despite all the requirements and problems, the problem has been solved successfully according to the present invention in that a metal piece which extends in the longitudinal direction of transportation is secured to the member which has at least one first plastics part in such a way that the end face of the at least one first plastics part projects over the metal piece in the longitudinal direction of transportation and that the total length of the member is greater than the total length of the metal piece. Unlike the known conveyance device, a metal piece is inserted longitudinally into each member of the line, this metal piece being 5 to 30%, preferably 10 to 20%, shorter than the total length of the member. A large part of the member is thus received by the metal piece, so that heat expansion with respect to this elongate portion is only relevant as far as the metal piece is concerned. However, since the metal piece is significantly less expanded than the plastics material, the feared extension in length is significantly reduced. Only a small residual part of e.g. 5 to 10% of the total length of the member consists of plastics material. Despite the higher heat expansion coefficient of the plastics material, an increase in temperature to the member as a whole results only in a slight increase in length. At the same time, it is possible for at least one end face of the member to be made of plastics material, so that either two plastics faces, or, at the most, one end of the metal piece with a plastics face frictionally rub against one another. The plastics material actually enables the members of the conveyance device to move relative to each other without any lubricant. This permits the desired accurate positioning under the individual processing stations and the workpieces which are fixed to a member can be guided with precision, but it is still easy to clean the conveyance device as a whole. With a preferred first embodiment, it is further provided according to the invention that the metal piece is a thrust pin extending through the plastics part of the member in the longitudinal direction of transportation, the one end of which thrust pin projects outwardly beyond the one first end face of the plastics part by an amount and the other end of which thrust pin bears against an abutment face which is arranged in the plastics part and which extends in the transverse direction of the member, which abutment face is disposed at a spacing from the second end face, which spacing is small in comparison with the length of the metal piece. With this embodiment, the one end of the thrust pin rubs against the plastics end face of the adjacent member, and this pairing of materials is to be found over the entire length of the conveyance device. Despite the use of the metal thrust pin, the total length of the member which is of fundamental importance in providing proper functioning of the conveyance device can be determined accurately with precision, for the abutment face is provided in the plastics part at a predetermined location which can be accurately determined. The abutment face is disposed at a specific distance from the second end face, so that the total length of the member is therefore established. Nonetheless, the total length is divided up in view of the material in such a way that the thrust pin extends over most of the longitudinal direction of transportation with the small heat expansion coefficient, whilst only the smallest part of the longitudinal direction of transportation of the member is taken up by plastics material. If made of non-corrosive steel, the thrust pin expands by only 1/10 compared with plastics material. This considerably reduces the total expansion of the member of the conveyance device according to the invention, even when there is an increase in temperature. The proportion of the length which still consists of plastics material and which expands, this proportion only being the part which is to be added to the length of the thrust pin is kept as short as possible, for example 5 or 10% of the total length of the member; short enough to permit mechanical stability of the member.

Another preferred embodiment is characterised according to the invention in that the member of the conveyance line has two plastics parts arranged at a spacing apart, each with end faces which project outwardly over the metal piece, and the plastics parts are connected together by the metal piece. When the member is designed in this way, the largest part of the heat expansion of the plastics segments can be inwardly oriented. The inner region is free and does not define the exact total length of the member. In addition, with this embodiment, it is possible to have end faces made of plastics material projecting at both ends of the member in such a way that plastics material rubs against plastics material when the members are disposed in the conveyance line and move. This almost completely prevents regions of friction.

The metal piece which connects two plastics parts can be arranged in the middle, but with a particularly preferable embodiment it is arranged outside on either side.

Therefore, it is particularly advantageous according to the invention if each member has two metal pieces fixed to the side jaws of the plastics parts in the form of bars, straps or rails, to which workpiece carriers are preferably undetachably arranged. Therein, it is expedient if fixture locations of the metal pieces to the plastics parts are disposed far apart or if they are provided on the outside in the end region of the member. This makes it possible to select a favourable division in view of the heat expansion, namely the main part of the heat expansion is transferred to the metal piece and only the remainder of 5% or more is left in the plastics part, since this projects outwardly and forms the lubricant-free end face in the form of a frictional face.

If the metal piece is in the form of a bar, an elongate element is provided which extends from one end region of the member to the oppositely disposed end region. These bars can simply consist of an elongate rod, but the bars can also be in the form of a double T-shaped bar, so that the main part of the bar is provided over the main longitudinal direction of transportation of the member, and small transverse bars are preferably provided in the end region, so as to provide proper means for preventing torsion. This enables the plastics parts to be provided against torsion at the correct place (on the outside) and to be fixed to the two metal pieces disposed on the side jaws.

With another embodiment, the metal piece is in the form of a strap or a rail. Therein, the structure can be plate-like and can even have reinforcing seams.

In each case, the metal pieces secured to the side jaws are connecting pieces in the chief sense of the word, for they connect two plastics parts which are arranged at spacings apart. At the same time, these metal pieces can also be used as supports for workpiece carriers. These latter can either be connected by way of the fixture of the metal pieces to the plastics parts, or they can be connected to the workpiece carriers separately.

A very favourable pairing of materials has been provided according to the invention such that the metal pieces are made of a rust-resistant steel and plastics material, preferably UHMW-PE (DIN 7728). A plastics material of this kind is compatible with conventional cleaning agents used in the food industry. At the same time, it has the desired mechanical properties, i.e. a plastics part made of a material of this kind is rigid and stable in shape, wherein the outer surfaces, in particular the end faces, can slide on one another properly without any lubrication.

The metal pieces or straps can clearly also be angular in shape, so as to thus provide for even simpler fixture of the workpieces to the members. Non-rusting steel is selected since it satisfies all the hygiene requirements imposed on food packs and expands to a significantly lesser degree than e.g. brass or aluminium.

The bar-like metal pieces are preferably inserted, as a means for preventing torsion, into the grooves provided accordingly in the plastics part in question. In this connection, it is particularly expedient if according to the invention the strap-like metal pieces have reinforcing ribs and if provided between the metal pieces and the plastics pieces are means for preventing torsion, e.g. pins, tightening screws, T sections, in such a way that each metal piece is secured non-rotationally to the plastics part.

The spacing e.g. of two connecting pins from each other in the longitudinal direction of transportation, which pins connect the strap-like metal pieces to the plastics pieces, is preferably selected so that it is as long as possible, in order to transfer the proportion of the heat expansion as far as possible onto the metal pieces. The material which remains in the respective plastics part outwardly towards the end face must be enough to ensure proper rigidity and functional safety. Small pins for preventing torsion can be arranged at the top and bottom at a spacing transversely from these connecting pins, these pins extending from the strap-like metal pieces from the outside to the inside, a little further into the plastics parts.

By way of example, if the total length of the member is about 200 mm, the spacing from the outer end of the connecting pin to the adjacent end face is only about 5 mm. With this embodiment, the portion is thus 2.5% on either side. As a whole, more than 5% of the length of the member contributes to expansion of the member, whilst 95% is accounted for by the metal piece of appropriately low heat expansion.

Figure 2:
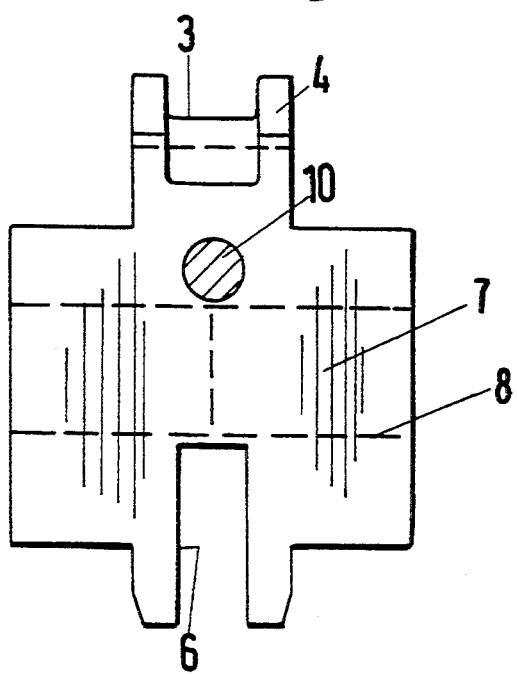
Figure 3:
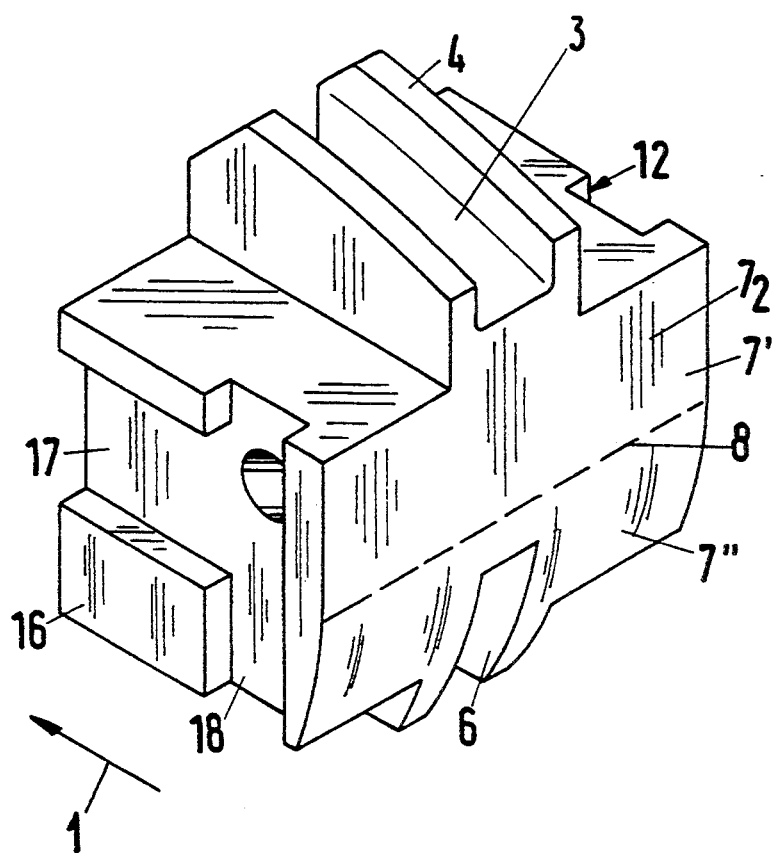
Figure 6:
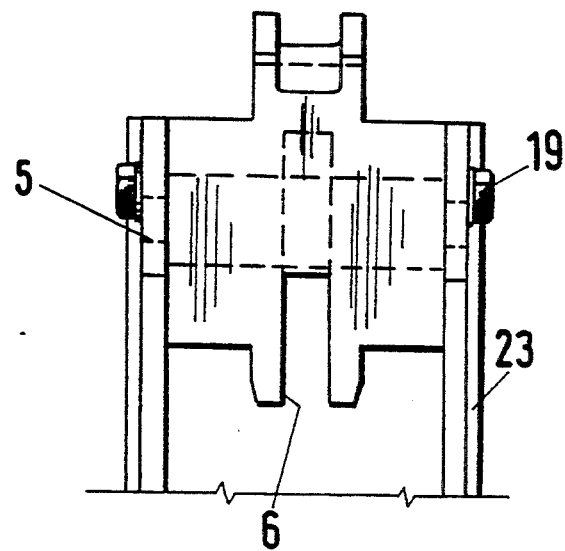
Figure 7:
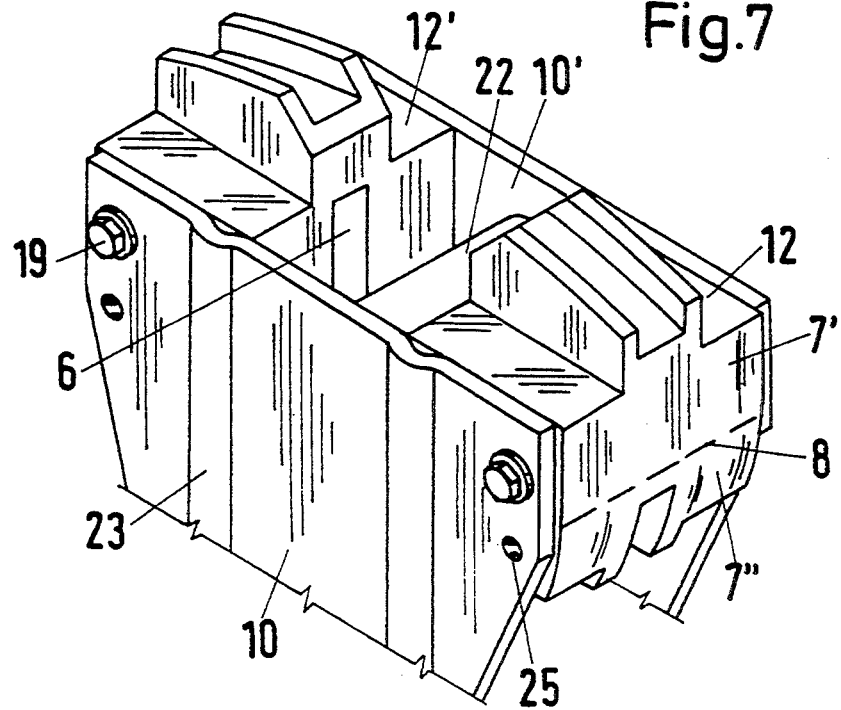
Figure 8:
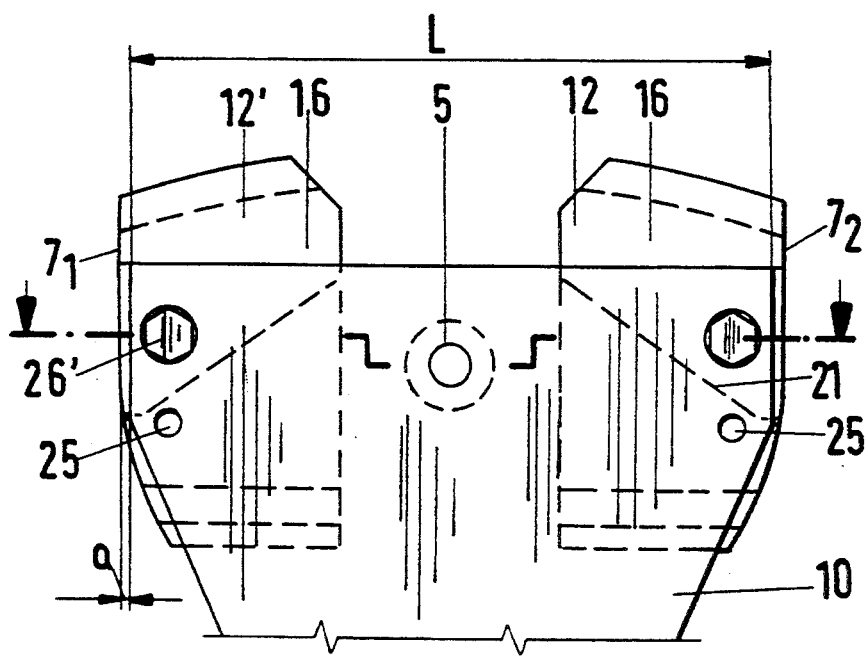
Figure 9:
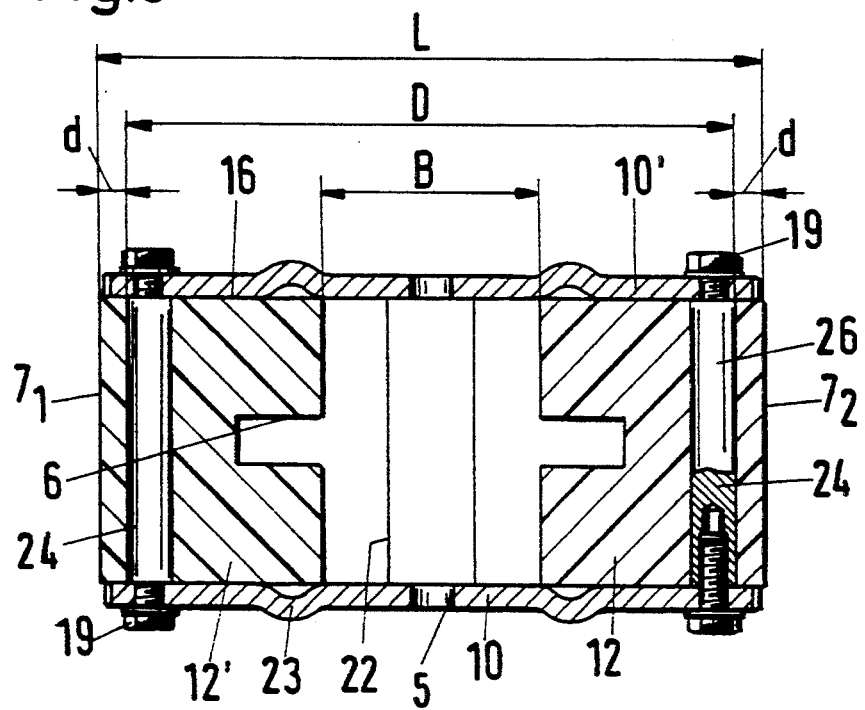

Further advantages, features and possible applications of the present invention will emerge from the following description, given in conjunction with preferred embodiments. In the drawings:

FIG. 1 is the longitudinal cross-sectional view through a first embodiment of a line member, FIG. 2 is a side view of the member in FIG. 1, from one end, looking from left to right in FIG. 1, FIG. 3 is the perspective view of a plastics part of another embodiment, wherein the member consists of two plastics parts which are held at a spacing apart and which are connected and held together by way of double T-bar-like metal pieces, FIG. 4 is an end side view of the plastics part in FIG. 3, FIG. 5 is a side view of the plastics part, looking from left to right in FIGS. 3 and 4, FIG. 6 is a front view of a plastics part with another third embodiment, wherein strap-like metal pieces are screwed at the side by way of connecting pins, FIG. 7 is the view in perspective of the member of the third embodiment in FIG. 6, FIG. 8 is a side view of the member according to the third embodiment, wherein only the reinforcing ribs are invisible, and FIG. 9 is a plan view of the member according to the third embodiment in FIGS. 6 to 8.

The longitudinal direction of transportation is shown for all embodiments simply by way of an arrow pointing to the left in FIG. 1 and it is denoted by the reference numeral 1, but the direction of transportation could also be in the opposite direction, so that the arrow ought to point to the right as well. The direction of transportation is still in the line 1. The transverse direction is shown in FIG. 2 by way of an arrow 2 pointing to the right, wherein here too the transverse direction could be supposed as being disposed in the opposite direction. In either case, the transverse direction is the line 2.

The member of the first embodiment according to FIGS. 1 and 2 is square in shape and is longer in the longitudinal direction of transportation 1 than in the transverse direction 2. With a preferred embodiment, it can be supposed that the line of members, not shown, extends horizontally in the longitudinal direction 1, wherein for the sake of simplicity the transverse direction 2 is also supposed as lying horizontally. The length L of the member is 200 mm, for example. Its width and also its height is 70 mm. A groove-like recess 3 which is curved and has two side jaws 4 extends on the upper outer surface in the centre in the longitudinal direction of transportation 1.

A bore 5 passes through the member in the transverse direction 2 about half way up the member in such a way that the bore 5 also passes through a bottom recess 6 which extends in the longitudinal direction of transportation 1. With a member which is incorporated into the line, this recess is disposed on the inner side which faces the direction-changing wheels (not shown either). By way of example, the teeth of the direction-changing wheels can be received in the recess. By virtue of its recess 6, the member engages in a curved end region of the conveyance device by way of direction-changing wheels.

A drive pin, not shown, is arranged fixedly in the bore 5. The teeth at the periphery of a drive wheel can therefore be responsible for moving the member in the direction of transportation. Since one member sits directly behind the other, the member which is being driven pushes the members in front of it in the direction of transportation 1 with a pushing effect in such a way that even when high pushing forces are introduced, no lengthening of the line is to be feared.

The afore-described upper groove B is provided for the sliding engagement therein of a curved guide rail which holds the member in the line on the outside, the guide rail not being shown here either.

At the front and rear end, each member is provided with an end face 7 which is a flat plane 7' above a line 8 marked by broken lines in FIGS. 3 and 7, whilst a curved surface 7'' is adjacent to the straight line 8. In the straight section of the line, not shown, the one member pushes the one adjacent to it over the flat end face 7''', and reciprocal pushing takes place along a line making contact between the curved end faces 7'', into the curved sections which are not shown but which it is easy to imagine.

Only with the embodiment in FIGS. 1 and 2 does the pushing drive act over the one end 9 of the thrust pin 10 which is the metal piece 10 in this embodiment.

Disposed adjacent to the bore 5 in the transverse direction 2, in the longitudinal direction of transportation 1, at a spacing away, are two small auxiliary blind bores 11, which, during operation, prevent the member from rotating about an axis passing through the axis of the bore 5 in the transverse extent 2.

The total length of the members in each embodiment is denoted by the letter L in FIG. 9. With the first embodiment shown in FIGS. 1 and 2, this is composed of the length 1 of the thrust pin-like metal piece $10 +$ the spacing d. The second end face $7_2$ of the plastics member 12 which is shown to the right in FIG. 1 projects over this, beyond the other end 13 of the thrust pin-like metal piece 10. In the embodiment in FIGS. 1 and 2, the first end face $7_1$ which is shown to the left in the drawings is offset to the rear of the one left end of the metal piece 10 by a spacing b, with the result that when the members are arranged behind one another, the respective one end 9 of the metal piece 10 rests against the second end face $7_2$ of the adjacent member, not shown, and thereby produces the pushing effect. With this first embodiment, the end 9 of a thrust-pin-like metal piece 10 therefore rubs an end face $7_2$ of member 12 made of the afore-mentioned plastics material.

The spacing d is formed by a transverse groove 14 being arranged in the transverse direction 2, passing from one side to the other, in such a way that a flat abutment face 15 results on the side which is adjacent to the right-hand end face $7_2$, against which abutment face said other end 13 of the thrust-pin-like metal piece 10 makes contact. This right-hand end 13 of the metal piece 10 is disposed exactly at the spacing d from the second end face $7_2$ of the plastics member 12.

It is to be appreciated that during operation, when the member heats up, expansion to its length is unavoidable, but favourable heat expansion coefficients can be used in order to make the overall expansion of the member low when it is heated. This is successful since the main expansion length is taken up by the metal piece 10, and only the remainder of the total length L is taken over by the portion d of the plastics member 12.

Therein, it is to be appreciated that the pin like metal piece 10 is arranged in the same longitudinal direction of transportation 1 as the spacing d measured between the right-hand end of the metal piece 10 in question and of the second end face $7_2$ is measured. The extent b by which the one end 9 of the metal piece 10 projects on the side shown to the left in FIG. 1 can be very small, e.g. only 10% of the distance d.

With the other embodiments shown in FIGS. 3 to 9, each member has at least two plastics parts 12 and 12' which are arranged at a spacing apart B (FIG. 9, internal width). According to the drawing of the third embodiment in FIGS. 6 to 9, these are joined together by two strap-like metal pieces 10, 10'. The metal pieces 10, 10' are secured to the outer side jaws 16 of the plastics parts 12, 12'.

With the embodiment in FIGS. 3 to 5, it is again possible to see the grooves 3 (at the top) and 6 (at the bottom) which extend in the longitudinal direction of transportation 1 on oppositely disposed sides. In addition, a longitudinal groove 17 which extends here in each side jaw 16 is provided in the longitudinal direction of transportation 1, and a vertical groove 18 extending transversely thereto is provided at the outer end. The longitudinal groove 17 and the transverse groove 18 in the plastics part 12 serve to receive a double T-bar-shaped metal piece, not shown, which is fixed through transverse bores 20 by connecting pins with screws 19 (FIGS. 6 to 9).

The metal pieces inserted in each of the side jaws 16 thus connect together two plastics parts 12, 12' and hold them firmly at a spacing apart, and by means of the double T-bar piece hold them so that they are also prevented from torsion.

Instead of the bent bottom recess or groove 6 according to the embodiment in FIGS. 1 and 2, with the other embodiments according to FIGS. 3 to 9 the bottom groove 6 is partly formed with straight boundary lines in the respective plastics part 12, 12'. In this respect, reference is made to the inclinedly extending broken lines 21 in FIGS. 5 and 8.

As with the second embodiment in FIGS. 3 to 5, with the third embodiment according to FIGS. 6 to 9, two plastics parts 12, 12' are also held at a spacing B apart (internal width) by two metal pieces 10, 10'. Whereas the central transverse bore 5 in the strap-like metal pieces 10, 10' are marked in FIGS. 6, 8 and 9, in FIG. 7 they have been omitted for the sake of simplicity. However, a spacer element 22 is shown in that drawing which can also be seen in the plan view in FIG. 9, and the drive pin, not shown, passes through it.

The metal pieces 10, 10' are here in the form of straps in which vertically extending reinforcing ribs 23 are additionally provided. Auxiliary blind bores 25 are provided in the form of a torsion prevention device at a vertical spacing below the connecting pin 24 with the screws 19, in which bores pegs, pins screws are inserted so that during operation the respective plastics part 12 12' is unable to rotate about the axis 26 or 26' disposed in the axis of the connecting pin 24.

We claim:

1. A conveyance device having a line of members which are held by means of guide rails, each member comprising end faces adapted for positioning next to adjacent members, grooves extending in a substantially longitudinal direction of transportation for receiving guide and drive means, a bore passing through the member in a direction substantially transverse to the longitudinal direction of transportation adapted to receive an entrainment pin, at least one metal piece which extends in the substantially longitudinal direction of transportation, and at least one plastic part that forms at least one of the end faces and projects over the metal piece in the substantially longitudinal direction of transportation, wherein the total length of the member is greater than the total length of the metal piece.

2. A conveyance device according to claim 1, wherein the at least one metal piece is a thrust pin extending through the at least one plastic part of the member in the substantially longitudinal direction of transportation, one end of the thrust pin projects outwardly beyond a first end face of the at least one plastic part, and another end of the thrust pin bears against an abutment face of the at least one plastic part which extends in a direction substantially transverse to the longitudinal direction of transportation, the abutment face being disposed at a spacing from a second end face of the plastic part that is small in comparison with the length of the thrust pin.

3. A conveyance device according to claim 1, wherein each member of the conveyance line has two of the plastic parts connected together by the at least one metal piece and at least one of the end faces of the member projects outwardly over the at least one metal piece.

4. A conveyance device according to any one of claims 1 and 3, wherein each member has two of the metal pieces selected from bars, straps and rails which are fixed to side jaws of the at least one plastic part.

5. A conveyance device according to any one of claims 1 and 3, wherein the at least one metal piece is made of noncorrosive steel, and the at least one plastic part is made of a plastic material that allows adjacent members to slide on one another without lubrication.

6. A conveyance device according to any one of claims 1 and 3, wherein each member comprises two of the metal pieces connecting two of the plastic parts, each metal piece comprising a strap having reinforcing ribs and means for preventing torsion of the plastic parts.

* * * * *

UNITED STATES PATENT AND TRADEMARK OFFICE
CERTIFICATE OF CORRECTION

PATENT NO. : 5,409,103
DATED : April 25, 1995
INVENTOR(S) : Norbert Hartel et al It is certified that error appears in the above-indentified patent and that said Letters Patent is hereby corrected as shown below:

Col. 1, line 52, "fun" should be --run--.
Col.6, line 3, "B" should be --3--.
Col. 8, Claim 2, line 30, after "the" and before "plastic" insert --at least one--

Signed and Sealed this

Nineteenth Day of September, 1995

Attest:

BRUCE LEHMAN

Attesting Officer

Commissioner of Patents and Trademarks